United States Patent
Kiefer et al.

(10) Patent No.: US 12,217,104 B2
(45) Date of Patent: *Feb. 4, 2025

(54) SYSTEM AND METHOD FOR MANAGING USER INTERACTION FLOWS WITHIN THIRD PARTY APPLICATIONS

(71) Applicant: Plaid Inc., San Francisco, CA (US)

(72) Inventors: William Fredrick Kiefer, Seattle, WA (US); Michael Brian Jacokes, San Francisco, CA (US); Jan Maksymilian Dudek, San Francisco, CA (US); Nathan James Tindall, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,988

(22) Filed: Jun. 28, 2023

(65) Prior Publication Data
US 2023/0342225 A1 Oct. 26, 2023

Related U.S. Application Data

(63) Continuation of application No. 17/405,364, filed on Aug. 18, 2021, now Pat. No. 11,714,689.
(Continued)

(51) Int. Cl.
G06F 3/00 (2006.01)
G06F 9/48 (2006.01)
G06F 9/54 (2006.01)

(52) U.S. Cl.
CPC ............ *G06F 9/541* (2013.01); *G06F 9/4881* (2013.01)

(58) Field of Classification Search
CPC ....................................................... G06F 9/54
See application file for complete search history.

(56) References Cited

U.S. PATENT DOCUMENTS 7,577,554 B2   8/2009 Lystad et al.
9,231,942 B1   1/2016 Pinkerton et al.
(Continued)

FOREIGN PATENT DOCUMENTS

WO   2018017767 A1   1/2018

OTHER PUBLICATIONS

Mark D Wilkinson, The Semantic Automated Discovery and Integration (SADI) Web service Design-Pattern, API and Reference Implementation. (Year: 2011).*
(Continued)

*Primary Examiner* — Lechi Truong
(74) *Attorney, Agent, or Firm* — Harrity & Harrity, LLP

(57) ABSTRACT

A system and method for cloud management of user interactions on a client device comprising: initiating, in response to an initiation request of a client application, processing of a workflow configuration with an initial session state, wherein the workflow is a data model of a graph of nodes connected with directed edges, where the nodes include a set of node types that includes at least a pane node; iteratively processing the workflow configuration, initially using the initial session state, and thereby generating rendered panes for use in a user interaction flow of a client application, which comprises: following a next edge of the workflow configuration to determine a next workflow node, processing the next workflow node, which comprises, when the next workflow node is a pane node, rendering the pane node into a rendered pane, and sending the rendered panes to the client device.

20 Claims, 6 Drawing Sheets

Related U.S. Application Data

(60) Provisional application No. 63/067,250, filed on Aug. 18, 2020.

(56) References Cited

U.S. PATENT DOCUMENTS

| | | | |
|---|---|---|---|
| 9,262,771 | B1 | 2/2016 | Patel |
| 10,142,307 | B1 | 11/2018 | Page |
| 10,250,612 | B1 | 4/2019 | Raposa |
| 10,452,523 | B1 | 10/2019 | Mjayalekshmi |
| 11,120,158 | B2 | 9/2021 | Hockey et al. |
| 2005/0268107 | A1 | 12/2005 | Harris et al. |
| 2005/0273773 | A1 | 12/2005 | Gold et al. |
| 2008/0195534 | A1 | 8/2008 | Landis et al. |
| 2008/0276242 | A1 | 11/2008 | Taniguchi et al. |
| 2008/0288621 | A1 | 11/2008 | Snell et al. |
| 2009/0254476 | A1 | 10/2009 | Sharma et al. |
| 2011/0099207 | A1* | 4/2011 | Brown .............. G06F 16/2465 707/E17.055 |
| 2011/0302132 | A1* | 12/2011 | Muthuvelu ............ G06Q 10/06 707/607 |
| 2012/0030125 | A1 | 2/2012 | Ramakrishnannair |
| 2012/0150742 | A1 | 6/2012 | Poon et al. |
| 2012/0215560 | A1* | 8/2012 | Ofek .................... G16H 70/20 705/3 |
| 2013/0212234 | A1 | 8/2013 | Bartlett et al. |
| 2014/0081667 | A1 | 3/2014 | Joao |
| 2014/0244804 | A1* | 8/2014 | Ying .................... H04L 65/762 709/219 |
| 2014/0330732 | A1 | 11/2014 | Grignon |
| 2015/0066805 | A1 | 3/2015 | Candee et al. |
| 2015/0249660 | A1 | 9/2015 | Bailey et al. |
| 2015/0317613 | A1 | 11/2015 | Clark |
| 2015/0350485 | A1 | 12/2015 | Kamada |
| 2016/0012368 | A1* | 1/2016 | O'Connell ....... G06Q 10/06316 705/7.26 |
| 2016/0028715 | A1 | 1/2016 | Sivashanmugam et al. |
| 2016/0080381 | A1 | 3/2016 | Hall |
| 2016/0350747 | A1 | 12/2016 | Pruthi et al. |
| 2017/0041963 | A1 | 2/2017 | Edge |
| 2017/0068954 | A1 | 3/2017 | Hockey et al. |
| 2017/0098294 | A1* | 4/2017 | Kim ..................... G06T 15/005 |
| 2018/0005316 | A1 | 1/2018 | Robbin et al. |
| 2018/0039988 | A1 | 2/2018 | Gupta |
| 2018/0064609 | A1 | 3/2018 | Hines |
| 2018/0067631 | A1 | 3/2018 | Thiercelin et al. |
| 2018/0095997 | A1 | 4/2018 | Beveridge et al. |
| 2018/0295514 | A1 | 10/2018 | Brown et al. |
| 2019/0012647 | A1 | 1/2019 | Bouey et al. |
| 2019/0102574 | A1 | 4/2019 | Roberts et al. |
| 2019/0200227 | A1 | 6/2019 | Woodward et al. |
| 2019/0207771 | A1 | 7/2019 | Hecht et al. |
| 2019/0278928 | A1 | 9/2019 | Rungta et al. |
| 2019/0340518 | A1* | 11/2019 | Merrill .................... G06F 40/56 |
| 2019/0370615 | A1 | 12/2019 | Murphy et al. |
| 2020/0134001 | A1* | 4/2020 | Kantamsetty ....... G06F 16/2246 |
| 2020/0211002 | A1 | 7/2020 | Steinberg |
| 2021/0081947 | A1 | 3/2021 | Hockey et al. |
| 2021/0182850 | A1 | 6/2021 | Morse et al. |
| 2022/0028012 | A1 | 1/2022 | Hockey et al. |
| 2022/0058065 | A1* | 2/2022 | Kiefer .................... G06F 9/541 |
| 2022/0116660 | A1* | 4/2022 | Walker ..................... G06T 3/40 |

OTHER PUBLICATIONS

Joshua Hibschman, Telescope: Fine-Tuned Discovery of Interactive Web UI Feature Implementation. (Year: 2016).*

Chee Sun Liew, Scientific Workflows: Moving Across Paradigms. (Year: 2016).*

Pea R.D., et al., "Video Workflow in the Learning Sciences: Prospect of Emerging Technologies for Argmenting Work Practices," Hall Open Science HAL Id: hal-00190028, Nov. 23, 2007, pp. 427-460.

Skara M., et al., "Reconstructing Custom Fragments of Google Knowledge Graph on the Fly," Proceedings of the ISWC 2020 Demos and Industry Tracks, 2020, 5 pages.

* cited by examiner

SYSTEM AND METHOD FOR MANAGING USER INTERACTION FLOWS WITHIN THIRD PARTY APPLICATIONS

CROSS-REFERENCE TO RELATED APPLICATIONS

This Application is a continuation of U.S. patent application Ser. No. 17/405,364, filed Aug. 18, 2021, granted as U.S. Pat. No. 11,714,689, which claims the benefit of U.S. Provisional Application No. 63/067,250, filed on Aug. 18, 2020, the contents of which are incorporated herein by reference in their entireties.

TECHNICAL FIELD

This invention relates generally to the field of application services, and more specifically to a new and useful system and method for managing user interaction flows within 3rd party applications.

BACKGROUND

The rise of application programming interface (API) services allows many applications to expand their capabilities. API service providers can provide services and capabilities in a consumable programmatic format that are increasingly used in various third-party applications. By way of example, these API services may include services for authentication, financial services, communication, and/or a wide variety of other services. In some cases, these service providers manage various user interaction experiences within the application. While these can be useful to many third-party applications, there are many challenges that can arise from developing an application that relies on the coordinated operation of the application and a third-party service.

In many cases, integrating with an API can require developing code and logic within the application that specifically enables the features of the API provider. This code and logic however may not be well adapted to accommodate changes in the API or service such as when new API versions are released or when new features are enabled. In some situations, an application's integration with an API may break when an API changes. As a result, the code and logic of the integration needs to constantly be updated to stay current with the API service provider.

Parallel challenges are also experienced by the API provider. An API provider will often have their API consumed by a vast number of different applications and services. Updates, new features, and other changes have to be weighed carefully to avoid complicating the development process of their customers. In particular, API services that facilitate portions of the user experience, such as various authentication processes or other interaction flows, may be limited in rolling out new features.

Many API service providers provide a software development kit (SDK) or other types of code libraries that a third-party application may incorporate into the native code of their application. Similar to challenges of supporting older versions of an API, there are many challenges for an API service provider relating to SDK/library version support when changing or updating the services and features of an API service. For example, changes to an API service provider can break functionality of an older version of an SDK version.

Thus, there is a need in the application services field to create a new and useful system and method for managing user interaction flows within 3rd party applications. This invention provides such a new and useful system and method.

DESCRIPTION OF THE EMBODIMENTS

Figure 1:
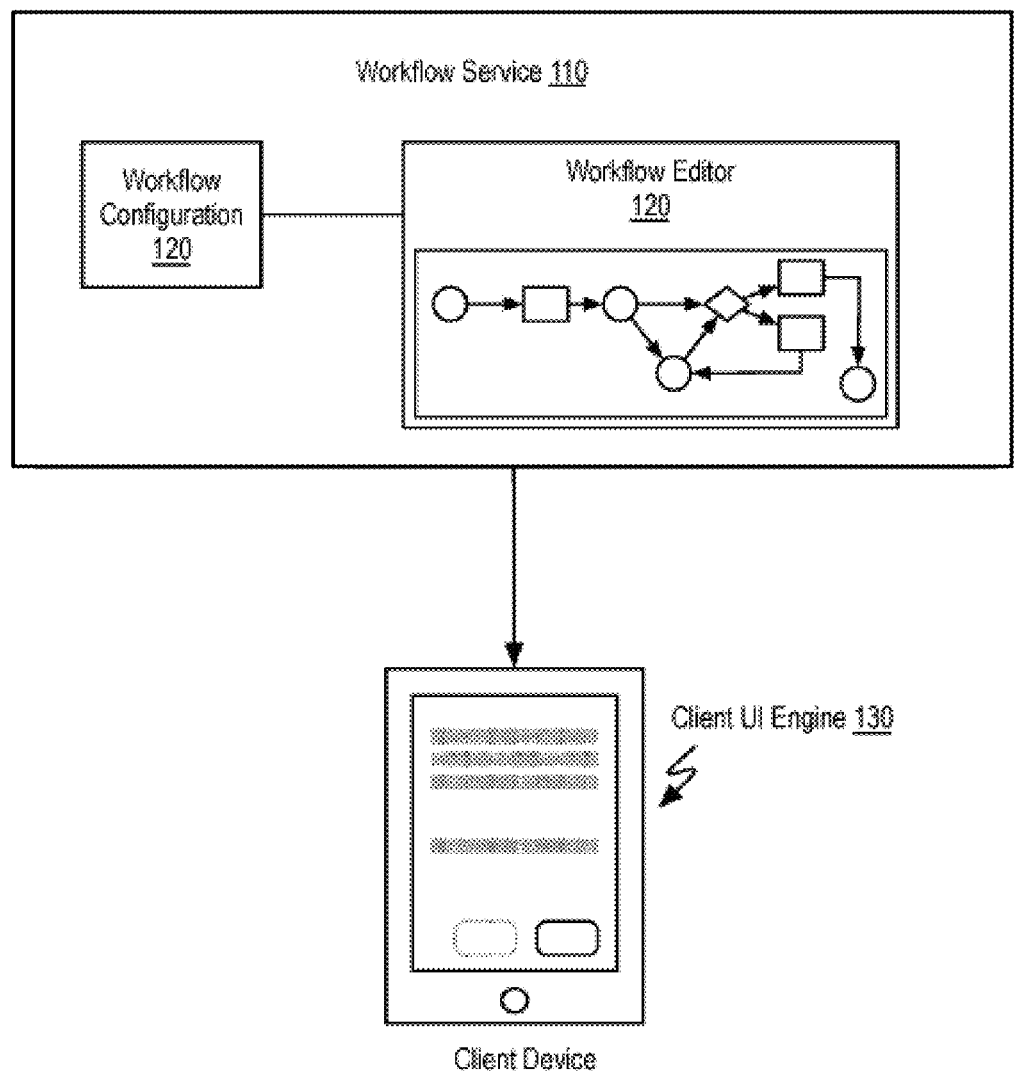
FIG. 1 is a schematic representation of a system.

The following description of the embodiments of the invention is not intended to limit the invention to these embodiments but rather to enable a person skilled in the art to make and use this invention.

1. Overview

A system and method for managing user interaction flows within a third-party application function to guide a client-implemented user interface based on cloud managed evaluation of a user interaction flow. In particular, the system and method enable the presentation of dynamic user experiences using a software development kit (SDK) within a client application but directed and managed by server-side configuration and code.

The system and method can enable the backend computing infrastructure of an API service provider (e.g., a remote/cloud-hosted server) to be in charge of a significant part of logic handled by a client for a particular user interaction flow. An SDK, library, or other type of client-side code can be implemented within a client application that uses generic workflow. In this way, the SDK can be made to be maintained as a reliable and consistent code base, and the backend can be used to design, and release new and different user interaction flows.

The system and method preferably process a directed graph data model of a workflow interaction on back-end hosted infrastructure and serve rendered UI data to a client application. The client application can then interpret the UI data (possibly through an SDK) to update the user interface. In this way, the client application may be alleviated of interpretation and managing of workflow interaction logic beyond repeated tasks (e.g., defined in an SDK) for rendering of UI elements, collection of input data, requesting updates from a cloud-hosted workflow service, and/or other basic operations.

The directed graph data model of a workflow interaction (alternatively referred to as a workflow graph or a workflow configuration) can be a state graph of nodes that defines transformations on data, logic used in navigating the graph, and nodes defining UI associated panes (i.e., user interaction components) to be rendered and used on a client application. The nodes are connected by directed edges that define possible paths for navigating the graph during a user interaction flow. Edges of the graph can be navigated as a result of an action at the client application (e.g., a user takes some action on the current rendered pane). Repeated actions result in traversing the graph of the workflow configuration until handoff or termination of the user interaction flow.

Using a workflow configuration to define the graph can reduce complexity in development of new user interaction flows, creating minor variations of a user interaction flows, and/or delegating editing and versioning of different portions of a user interaction flow to various parties.

In one variation, the graph of the system and method includes a type of node referred herein as a pane node. Pane nodes take input data to generate a rendered pane which can be or at least specify parameters for a user interface presentation (e.g., a view and/or audio) to be presented by the client application. The outbound edges to a pane node are defined by paths resulting from possible actions taken on the rendered pane when presented at a client application.

In one variation, the graph of the system and method include three basic types of nodes, which includes a pane node, a processor node, and a switch node.

Processor nodes can be used, in addition to other things, from interacting with and getting data from dynamic external systems (systems within the API service provider and/or other external computing services or computing systems). For example, processor nodes can encapsulate programmatic logic for arbitrary interactions with external systems in the backend, such as running a data extraction or looking up status of some element. Processor nodes more generally function to transform input data into output data.

Switch nodes function as a mechanism for defining how to branch the state graph. A switch node examines input data (i.e., output data from a previous node in the graph) and selects one of multiple possible output edges for traversal. Use of switch nodes, while not necessary, do offer a form workflow abstraction that simplifies development of a user interaction flow. The three core node primitives of a pane node primitive, a processor node primitive, and switch node primitive can be configured to make up a statically defined state machine for a desired workflow. This may allow for configuration-only deployment, static analysis, easy testing, easy versioning, and useful tooling.

The system and method may also be combined with a workflow editor interface, which can enable administrators of the workflow interactions to create new workflows and/or change workflows. Additionally, in some variations, the system and method may support ways of sharing workflows, portions of workflows, and/or workflow nodes. In some implementations, a library of different capabilities can be offered across a team so that new user interaction flows can be more quickly created and changed. The workflow editor interface and the modular nature of the workflow configurations can be such that users may more readily create new user interaction flows, edit user interaction flows, and/or create variations of existing user interaction flow.

The system and method may be particularly useful in situations where a user interaction flow is executed within a client application, but the client application is developed by an entity that differs from the entity managing the user interaction flow. One example of this situation is when a service provider, such as an API service provider, is directing the user interaction flow within a third-party client application. Traditionally, an SDK of the service provider or other custom application logic in a client application handled a large amount of logic when interacting with the API service provider. This approach can be accompanied by many complications. For example, new interaction flows or changes to user interaction flows, in some cases, relied on updating of an SDK and then rolling out an update to the third-party client application. The system and method can reduce dependency on the client application and enable a novel approach for directing user interactions from the back end. The system and method can be used to facilitate a best-in-class user frontend user experiences in a third-party client application, while maintaining the development advantages of a backend-only deployment.

The system and method may be used in connection with offering some programmatic services related to a user interaction experience described herein as a workflow interaction. In one example, the system and method may be used to manage the user interaction flow for an authentication process. The workflow interaction may guide an end user on a client application through requesting credential information, verifying authentication information, possibly filling in profile information, possibly handling any error states, and/or managing any suitable part of the user interaction involved in the authentication process. Other examples of user interaction flows could include checkout processing flow, user-on-boarding, and/or other types of interaction experiences. As one example, the system and method may be used in managing client user interaction flows for authentication using an authentication process like that discussed in U.S. patent application Ser. No. 14/790,840, filed Jul. 2, 2015, U.S. Pat. No. 9,449,346, and titled "SYSTEM AND METHOD FOR PROGRAMMATICALLY ACCESSING FINANCIAL DATA", which is hereby incorporated in its entirety by this referenced. The system and method may alternatively be used for any programmatic service.

The system and method can enable a new form of client integration, which may reduce hard-coded, imperative logic built into a client application for navigating a particular interaction flow of an API service.

For example, the system and method may simplify API service integration for a client application such that the native code of the client application (e.g., written by a developer of the client application or managed by an included SDK) can be alleviated from having to be explicitly configured with information like what input fields or text to show to a user, how to use a complex set of API endpoints, how to process responses to determine how to update a UI, and/or other aspects related to how to update a UI based on API interactions.

Additionally, the system and method can make cross-ecosystem development significantly simpler. Cloud management of user interaction flows can enable rendering-focused SDKs (without complicated workflow logic) to be developed and deployed to multiple app ecosystems like iOS, Android, and the web. Changes to a user interaction flow can be made in the cloud computing environment, without necessarily requiring updates to the various app ecosystems.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

As one potential benefit, the system and method can function to simplify and enhance the developer experience. The system and method enable API and SDK integration of a client application with an outside API-driven service to be more easily developed. For those doing the initial integration, this can simplify the process thereby accelerating the rate at which they can build a client application with API integration. It further enhances maintenance and ongoing development—changes and updates to the workflow interaction may require no changes by the developer of the client application.

As a related benefit, the system and method can use the system and method in order to provide a more stable SDK. The system and method will generally delegate more complex logic to the network accessible resources of a cloud hosted workflow service. As a result, the SDK and/or components built into the application code may be simplified, at least for the portions related to managing workflow interactions. In some implementations, the SDK may operate as a thin render for the backend-defined interaction flows. In this way the SDK may not need to be updated to accommodate changes to an interaction flow.

As another potential benefit, the system and method can shorten development time for the developer of the API service. In the system and method, changes to workflow interactions are less tied to SDK version releases. The API service provider can push out code to the backend to update a workflow interaction.

Related to this, the API service provider can have options of creating custom functionality or features offered to different subsets of their user accounts.

As another potential advantage, the system and method may enable a workflow to be configured as a static graph while also potentially including interaction with dynamic external systems. In one variation of the system and method, processor nodes in a graph definition can be configured to perform various transformations of data and to interface with other dynamic systems which could be internal systems or external systems accessed over an API or other suitable channel.

As another potential advantage of the new code deployment opportunities. Tests or experiments such as multivariate or A/B tests can be implemented because the changes can be remotely and dynamically managed. Similarly, new features can be rolled out gradually across an API services users. For example, logic could be used to dynamically use one of existing version of a workflow configuration or a new version of a workflow configuration across multiple client applications.

Herein, the system and method are described with references to service providers and client applications. These terms are used as exemplary descriptions of these different components and/or entities but is not intended to limit them to necessarily be operated by different entities.

A service provider as used herein is generally characterized as a computer-implemented platform facilitating the workflow service. The service provider will generally be an API service provider, which may be operating as a SaaS (software as a service) computing platform. The service provider may additionally be a multi-tenant computing platform that supports multiple independent accounts. As an example, a service provider may enable integration with one or more financial accounts by an end user. A plurality of different client applications may make use of this service provider to enable the end user of the client application to connect to and/or perform actions with a financial account. Herein the people interacting and managing the infrastructure and features of the service provider are generally referred to as administrators.

A client application is preferably an application or service operating on a client device. A client device can be a computing device with a user interface for interacting with a user. The client device can be, for example, a personal computer device used by an end user. For example, the client device may be a smart phone, smart watch, smart glasses, smart audio system, a computer, a tablet, a smart TV, and/or any suitable computing device. The client device may alternatively be a browser, terminal, or any suitable viewer for an application. The client application will generally include an SDK or code library from the service provider, but the client application may alternatively include native code directly defining instructions for interactions with the service provider.

2. System

As shown in FIG. 1, a system for managing user interaction flows within a third-party client application can include a workflow service 110 that can be configured with workflow configuration 120 to generate rendered panes; and a client user interface (UI) engine 130 that presents, and monitors user actions performed within a rendered pane. The workflow service 110 is preferably a cloud-hosted system (e.g., a remote server or computer system accessible over a network) that interfaces with multiple instances of client applications/devices. The client UI 130 is preferably operable on the client application/device. In some variations, the system can include the workflow service 110 and the workflow configuration 120, which are configured to work with an external client UI engine 130. In other variations, the system can include the workflow service, workflow configuration 120, and the external client UI engine 130. In another variation, the system can include the external client UI engine 130, which can be configured to interface with an external workflow service 110. The system may alternatively be any suitable combination of variations and elements described herein.

The workflow service 110 functions to process and evaluate the logic and render user interface data according to a workflow configuration 120. The workflow service 110 is a computer-implemented system that is hosted and implemented as part of a backend system. The workflow service 110 can be remotely accessible over a network (e.g., the internet) by one or more client applications. For example, the workflow service 110 can be implemented as part of an internet-accessible cloud infrastructure for an API service platform. The workflow service 110 may be implemented as part of an API service computing platform. However, the workflow service 110 may alternatively operate independently and connect with one or more other API service platforms.

The workflow service 110 primarily evaluates workflow configuration 120, which, as described herein, can be a directed graph defining an interaction flow. The workflow service 110 can traverse and evaluate nodes in the workflow configuration 120 resulting in UI data. The UI data, described herein as rendered panes, can be communicated to a client application. More specifically, the UI data is communicated to a client application with the client UI engine 130. The client application can then use the rendered panes to present a corresponding user interface. In one implementation, the rendered panes may be communicated to and processed by a corresponding SDK (i.e., a client UI engine 130) integrated into the client application to present the corresponding user interface. The client application may return data representing user actions and other information gathered by the rendered pane, and then the workflow service 110 can continue in its traversal of the graph structure of the workflow configuration 120 based on the user actions. This process loop (involving the workflow service 110 navigating and processing the workflow configuration 120, communicating rendered panes, the client rendering panes and then requesting updates with new data) can continue until the graph is exited.

The workflow service 110 preferably maintains all needed data as part of stored session state. Accordingly, the workflow service 110 may include a session state database or data record for maintaining session state for each instance of a workflow. The session state can include global data, request data, node output data, and/or other suitable types of data. For example, all the user actions and input from previously presented rendered panes can be stored.

In general, the workflow service 110 is used in facilitating user interactions for a plurality of different instances of client applications. Session state can be maintained for each individual client application. Furthermore, the workflow service 110 can support different types of client applications.

The workflow configuration 120 can be maintained within the workflow service 110. The workflow service 110 can handle evaluation of the workflow configuration 120 so that a client application can reduce its responsibility to managing presentation of the UI data generated by the workflow service 110. This may alleviate a client application from having to deal with logic of negotiating an interaction flow, which even for seemingly simple tasks can get very complicated when addressing possible errors, edge cases, and/or other conditions.

The workflow service 110 can additionally include configuration to manage communication from and to the client application. The workflow service 110 can handle workflow related requests from clients. One variety of requests may initiate or start a new workflow. Another variety of requests may request an update to the workflow as a result of user interaction or another input at the client application. The workflow service 110 additionally communicates UI data to a client application. In particular, the workflow service 110 generates rendered panes (or views) that can be communicated to a client application.

The workflow service 110 can include a workflow service API, which functions to expose a programmatic interface through which an instance of a client application (i.e., a client application instance), and more specifically a client UI engine 130, can communicatively interact for the purpose of enabling a user interaction flow on the client application instanced. The workflow service API can be a REST (Representational State Transfer) API, a GraphQL API, SOAP (Simple Object Access Protocol) API, and/or other suitable type of API. The workflow service API, in some variations, involves request and response communication over a HTTP (Hypertext Transfer Protocol) based application layer protocol. However, any suitable communication protocol or style of API may alternatively be used.

The workflow service API exposes an API endpoint, such as a URL (Universal Resource Locator) or URI (Uniform Resource Identifier), for initiating a workflow, for transitioning between rendered panes, and/or for updating with newer data.

In one example, the workflow service API can expose an API endpoint like "workflow/start", "workflow/next", and "workflow/update". Other suitable set of API endpoints may alternatively be used.

The start API endpoint (e.g., "/workflow/start") can be used for a client to send initial configuration/initiation data. The data may be used to initialize the session state. The data may also be used by the workflow service 110 to select an appropriate workflow configuration 120 to be used. A workflow configuration 120 may be selected based on an identifier of the type of client application, a user identifier, and/or any other suitable information. In some versions, dynamic selection workflow configuration 130 can be used when performing multivariate or A/B tests, when performing gradual rollout out of a new workflow version, and/or during other situations. In this case multiple options of a workflow configuration 130 may be dynamically selected (e.g., randomly, based on some data property of the start request, etc.).

In response to a client request to a start API endpoint, the workflow service 110 processes the request and processes an appropriate workflow configuration 120, and then returns a first set of rendered panes that the client can display.

The "next" API endpoint (e.g., "/workflow/next") can be used to transition to new rendered panes. This may be referred to as a workflow update API endpoint. During one version of usage, the client sends collected user input as a data object representing the user action along with any previous pane input data not yet sent to the server. Other suitable information/data may also be sent. In response, the background processes the request, uses the updated data to walk/process the workflow configuration 130, and then returns the next set of rendered panes that the client can display.

The state update API endpoint (e.g., "/workflow/update") can be used to communicate updated data from the client without requiring new rendered panes. This may be described as a state update API endpoint or an analytics API endpoint. A client can send an update of when the client transitions to a new pane, possibly with other collected data. The backend can use the updated data to update session state and/or potentially update the current position in the graph of the workflow configuration 120 (e.g., updating the current node). The update API endpoint can be used for consistent analytics or logging when navigating between panes when the client already has the rendered panes (e.g., cached or sent as a set of neighboring panes). The update API endpoint may, in some implementations, be combined or replaced with the next API endpoint.

The workflow configuration 120 functions to model a directed graph that defines the logic and generated user interface elements. Preferably, the workflow configuration 120 is static data that represents a user interaction experience. The workflow configuration 120 preferably represents the user experience as a directed graph. The workflow configuration 120 can be stored and processed by the backend workflow service 110 thereby generating data that a client UI engine 130 (e.g., an SDK of the API service provider) uses when rendering a user interface. Interactions with the rendered user interface results in updated processing of graph model of the workflow configuration 120.

The workflow configuration 120 may be formatted or organized into any suitable file type. In one variation, the data of the workflow configuration 120 is a data file or files configured as a serialized structured data. A limited set of exemplary data formats for the workflow configuration 120 could include a protocol buffer format (e.g., a proto file format), a JavaScript Object Notation (JSON), Extensible Markup Language (XML), and/or other suitable file formats.

The workflow configuration 120 may be edited and created from any suitable source. In one variation, the workflow configuration 120 is generated and edited by a workflow editor 140.

As discussed, the workflow configuration 120 preferably defines a directed graph that specifies how to generate new UI data. The directed graph preferably includes a number of nodes that are connected through directional edges. A node will have one or more inputs and/or one or more outputs.

Figure 2:
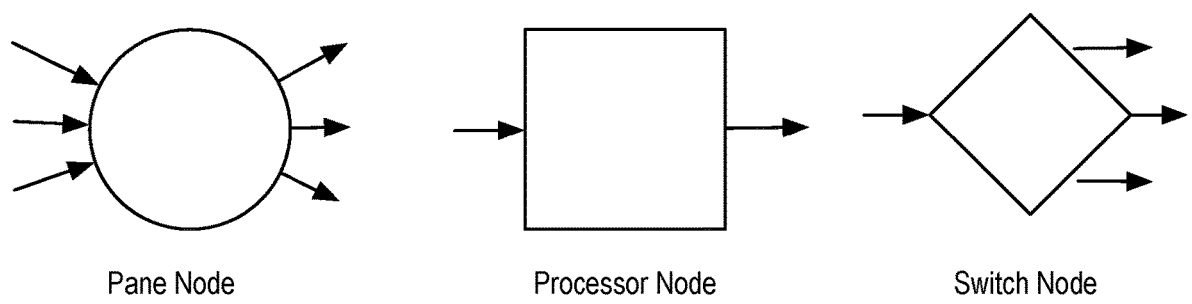
FIG. 2 is a schematic representation of exemplary node types in a workflow configuration graph.

There may be different types of nodes that handle different operations. In one variation, the workflow configuration 120 is a directed graph of nodes that include at least the type of node: a pane node 121. In another variation, the workflow configuration 120 is a directed graph of at least three types of nodes: a pane node 121, a processor node 122, and a switch node 123 as shown in FIG. 2. Below is a description of properties of a collection of node types for such an implementation. The system is not limited to these node types and other alternative implementations may also be used.

A pane node 121 functions to define a discrete step within a UI interaction experience. A pane node 121 therefore can represent a corresponding pane or "UI element" (e.g., a UI view, a module defining some unit of a UI interaction) within a workflow interaction.

A pane node 121 can be a static data template. A pane node will generally have a render method that takes incoming data payload (from an incoming edge) and configures the pane properties to generate a rendered pane. The render method can include programmatic logic to translate incoming data payload (e.g., the current state) into a rendered pane data object. For example, based on supplied input data, a pane node 121 may set various UI properties such as colors, text content, media assets, fields, and the like. The output of the render method can be a client pane data object, referred herein as a rendered pane, that can be delivered to and rendered by a client application. Pane nodes 121 are preferably not directly sent or processed by a client, and instead a resulting rendered pane can be sent. The rendered pane, and more preferably a set of rendered panes, can be communicated in an API response to a client application.

A rendered pane may be a programmatic prop (property) data object. A UI component can accept the props as input for returning a UI element for presenting in a user interface. (e.g., displaying a view on a screen). For example, the rendered pane could be a React Component prop which can be used by a React Component for updating a user interface at the client application that uses the React JavaScript library.

In one implementation a pane node may have any suitable number of incoming edges, and an outgoing edge for each user action supported by the pane as shown in FIG. 2. For example, a pane node may have an outgoing edge for three possible actions: "submit", "cancel", or "select an item in a list". The output of the user actions (e.g., user credentials when submitting credentials for authentication) is preferably stored in the session state. Herein, circles are primarily used to represent pane nodes in depictions of nodes of a graph of a workflow configuration.

The pane nodes are preferably used to render a pane (a rendered pane), which is UI data that can be sent to the client application. The pane node 121 takes current session state (or data passed to the node) and specification of the pane node to output a rendered pane. The rendered pane includes the necessary data that is needed at the client to render the desired UI. For example, the text, graphics, input fields, buttons, and/or other UI elements can be described in the rendered pane. In one implementation, a rendered pane can include a pane type (e.g., "credentials pane", "user information pane", "information pane", etc.) and information data used to display the pane type to a user (e.g., color options, text/strings, assets such as an image, labels, interaction option settings, etc.). In one implementation, a set of different pane types can be provided, where the pane types serve as UI element templates that can be updated with the pane information data. Alternative forms of UI element specification may be used for a rendered pane such as specifying the rendered pane as a data object defining HTML (HyperText Markup Language), CSS (Cascading Style Sheet), and/or JavaScript. The rendered pane can preferably be interpreted by a client application operating on the client application. In one preferred implementation, the client UI engine 130 (e.g., an SDK) provided by the service provider can be installed within the client application and used to render the rendered panes. In an implementation making use of pane types, the client UI engine 130 can include configuration to present rendered panes for the possible pane types.

The pane can be a modal UI element wherein a single pane is presented at one time. For example, during a sign-up user interaction flow, the pane can a UI window in a graphical UI, where each pane is a different slide, page, or visual state of the sign-up user interaction flow. In another variations, however, a user interaction flow may have at one point, multiple panes used in combination. For example, a set of rendered panes may include a parent pane that can contain child panes.

In one variation of a pane, the pane defines a UI view with discrete set of possible actions within the UI view. In other words, a pane (and its resulting rendered pane) can correspond to a discrete step within a user interaction flow. In the sign-up user interaction flow example, one pane may display a set of user input fields such as name, email, and password, and a button to submit the information for sign-up. The previous and/or next stage of the user signup interaction flow can be a different pane in this exemplary implementation. In another variation, a pane may define a UI element with multiple states of a user interaction. For example, a pane could provide data to fully enable a digital survey that collects user responses to multiple prompts across multiple sequentially displayed views.

A processor node functions to allow a static graph to interact with dynamic code. The processor nodes are where logic can be defined to interact with external systems and code.

In one implementation, a processor node may be defined as a one-to-one node that has one incoming edge and one outgoing edge as shown in FIG. 2. In this way, the processor node may not alter the path of a workflow and it functions primarily as a transformer of data. In other words, this one-to-one form of processor node can ensure that there is no graph edge state or traversal decision contained within imperative code. The processor node can act on data for transforms, data-retrieval/fetches, external system integration, and the like. In some variations, a processor node may have multiple incoming edges, in which case, for example, the data passed from each incoming edge includes required data for the processor node. Herein, blocks/squares are primarily used to represent processor nodes in depictions of nodes of a graph of a workflow configuration.

The processor node may be directed to a single function or process. A function or configuration for an executable process invoked by a processor node may be statically defined in data, the workflow service 110 can invoke the function in accordance with the processor node 121. Implementing processor nodes as primarily functional transformers, which be accompanied with many potential benefits such as: preventing graph-walking logic from being used, enabling processor nodes to be re-used across different workflows, and/or keeping code modular and unit testable.

Configuration defining a processor node may specify logic but may alternatively delegate logic definition to an external resource. In one example, the processor node may be associated with configuration details and a script defining implementation and logic of the processor node. The configuration examples may specify input state (e.g., inputs for the processor node) and output state (e.g., the result output by the processor node) and/or any node specific data or configuration information. In another example, a processor node configured in the workflow configuration 120 may specify an internal API, which manages the definition of the actual logic. The return value from the internal API can then be used as the output.

The output of the processor node is preferably always stored in the session state. Though in some alternative instances it may be temporary and communicated to the next node.

A switch node functions to enable a workflow graph to branch based on the session state. The switch node can be configured to operate like a switch statement by testing a value and then picking an outgoing edge based on the value. Accordingly, one implementation of a switch node has a single input edge with multiple output edges, where an output edge corresponds to a different case(s). In some variations, however, a single switch node may alternatively have an incoming edge from multiple other nodes. In such a variation, the incoming data payload will generally be of similar or the same format for processing. Herein, blocks/squares are primarily used to represent processor nodes in depictions of nodes of a graph of a workflow configuration.

A switch node can be configured without specifying any logic and can be configured by specifying the value conditions and the corresponding outbound edge that is mapped to the value. When a switch node 122 is processed by the workflow service 110, a single property on the incoming data payload (e.g., from a stored session state) is examined and used to determine the external edge to follow. In some variations, multiple properties may be examined. In one implementation, configuration of a switch node may be defined in data as a property to check and a list of key value pairs that map case values of the property to edges. An example of a switch node may be a switch node that tests the session state variable for indication that an end user agreed to a terms of service agreement. If not, then the outgoing edge directs flow to an outgoing edge that results in rendering a pane for terms of service. If so, then the outgoing edge skips the terms of service pane.

Figure 6:
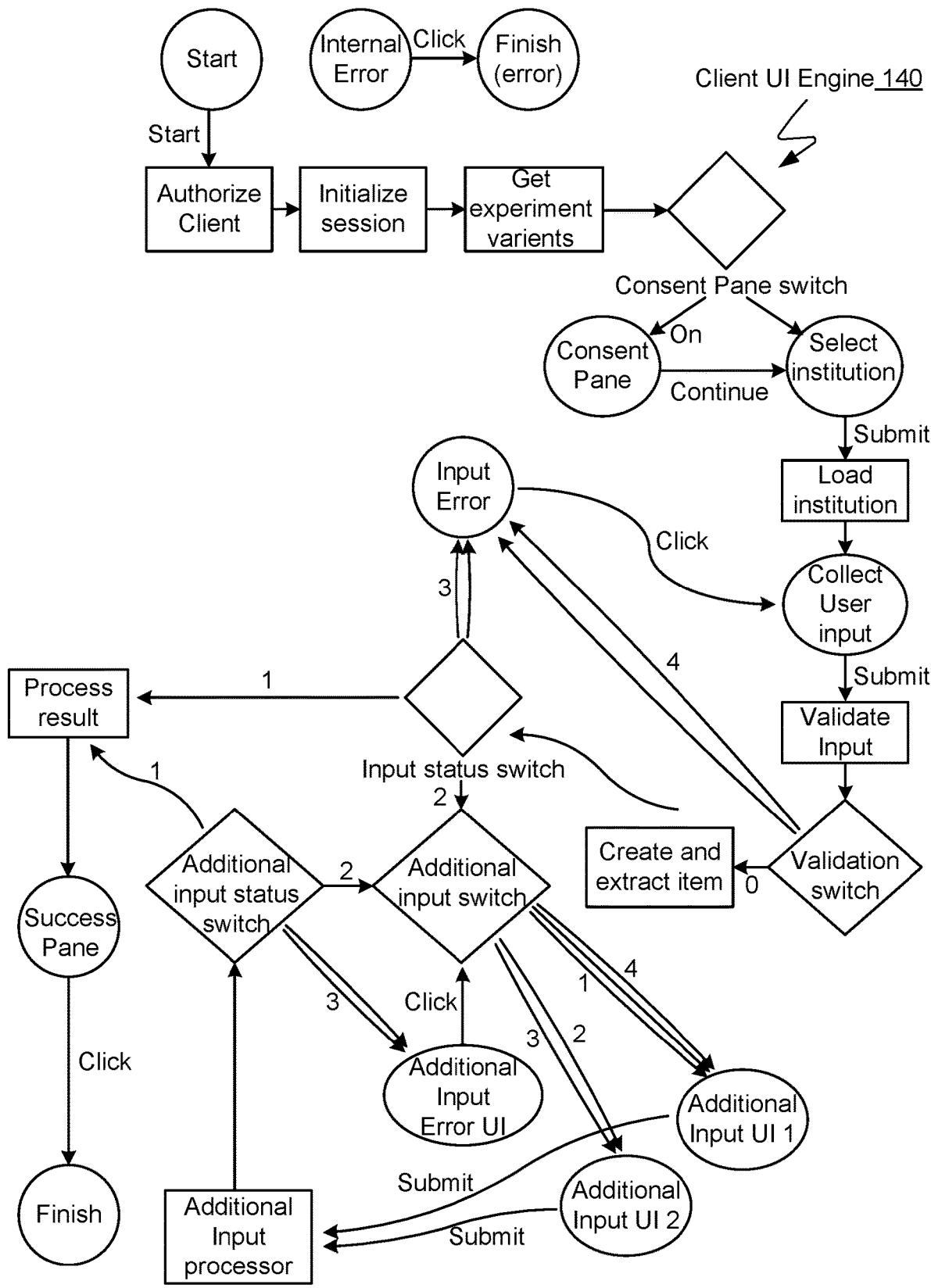
FIG. 6 is an exemplary representation of the directed graph of a workflow configuration.

In some variations, the system includes a workflow editor 140, which functions as a graphical user interface for creating and/or editing workflow configuration 120. The workflow editor 140 may be implemented using a variety of user interface paradigms. Preferably, the workflow editor 140 enables a user to create nodes, edit the properties of those nods, and edit connections between the nodes. In one implementation, the workflow editor 140 may present the workflow of the workflow configuration 120 as a visual directed graph of the nodes such as in FIG. 6. Presentation of the node and the edges in the directed graph of the workflow configuration may be selectable and editable through such interactions. Nodes and edges may be added, altered, and/or deleted. For example, the order of various rendered panes can be altered by reordering the associated pane nodes 121 using the workflow editor 140.

A workflow editor 140 may enable a wide variety of administrators to edit and collaborate within a workflow.

There may be a variety of features to enhance the collaboration and use of the workflow editor 140 within an organization.

As a first example, the workflow editor 140 may enforce permissions for collaborators on a workflow. Permissions may restrict which aspects can be viewed and/or changed. For example, an account for an administrator from a marketing department may be granted editing permission over the copy presented within the user interfaces while a developer may be granted more permissions to alter logic and user interface flow. In other words, select properties or elements of a pane node 121 may be editable by a select set of users. In the implementation described above for a pane node 121, a render method of the pane node 121 may be edited to alter the generated strings output as a prop data object in the rendered pane. Continuing the example, an account for a developer may be able to change any aspect of the workflow configuration 120 including creating new nodes and editing the graph.

As a second example, the workflow editor 140 may additionally enable features for importing or depending on other nodes, workflows, or portions of workflows. The workflow editor 140 may additionally alternatively include overriding a referenced parent workflow or node.

In one variation, workflow configurations may import or reference additional workflow configurations. For example, a first workflow configuration may define a user onboarding interaction flow and include a subsection within the graph of the first workflow configuration that references a second workflow configuration that defines a portion of the interaction flow that retrieves consent to various policies from a user. The workflow editor may enable navigation between different interconnected workflow configurations.

In an example of referencing other nodes, the workflow editor 140 may have a library of nodes that can be added to a workflow configuration 120. In some instances, a type of node from a library of nodes may be fixed to serve a set purpose. For example, a pane node for displaying an error message may not be editable except by select users with permission. In other instances, a type of node from the library of nodes may be customizable. For example, a pane node for collecting user input may be selected and customized to specify the number of input fields, the type of fields, data labels for the fields, user labels for the fields, and/or other information. This can make it easier for non-developers to easily create new interaction flows using a set of pane types.

Since the system can make customization and modification of a workflow very flexible, the system may additionally include tools to manage a diversity of workflows. Accordingly, the system may include workflow versioning to support a wide variety of versions to be invoked. In one implementation, the workflow versioning can be implemented such that a wide variety of experiences, variants (which may be used for testing), and/or other version updates can be selectively used. A semantic versioning scheme may be used to enable different versions of a workflow to be easily initiated in response to a workflow request. In some variations, the workflow service 110 may dynamically determine which workflow configuration to initiate for a given request.

In some instances, various rules may be set for how different workflow configurations are used. For example, the workflow editor may be used to set mapping of workflow configuration versions to customer accounts (e.g., different client application identifiers), individual users, different geographic or spatial location, and/or other properties. As discussed, the system may support multivariate and/or A/B testing of different workflow configuration versions. In one variation, a set of workflow configuration versions can be selected for testing. The population for testing could optionally be specified. Then the workflow service 110 may automatically select from the set of workflow configuration versions and log collected analytics for each workflow configuration version.

The client UI engine 130 functions to implement the rendered panes generated by the workflow service 110. The client UI engine 130 may be implemented as part of an SDK or library offered by the service provider. An application developer can integrate the SDK with their client application so that the client application can invoke the workflow interaction. The client UI engine 130 is preferably not responsible for performing complex workflow logic. The client UI engine 130 is preferably configured to present a rendered pane, collect any user input or other suitable data input, update the rendered pane in response to an action, and/or request an update from the workflow service 110. The client UI engine 130 may additionally facilitate logging session state analytics.

As discussed, the system can be used to facilitate user interaction flows within a plurality of client applications. In some implementations, it can facilitate user interaction flows for not only multiple distinct instances of client applications but for multiple distinct types of client applications. As one example, the workflow service 110 may operate as part of offering a digital financial tool used in accessing or interacting with various external financial accounts. Multiple different types of applications may make use of such offering and include the SDK (i.e., the client UI engine 130) within their applications. In this way, the workflow service 110 can interact with multiple users of the various types of applications.

The client UI engine 130 interfaces with the workflow service 110 through the workflow service API. The client UI engine 130 can initiate the start of an interaction flow based on a trigger within the client application. In response, a set of rendered panes can be received. The rendered pane can be presented in the user interface, and then any user action or new data collected can be used in determining next steps. User action may trigger requesting updated rendered panes from the workflow service 110, using local rendered panes, and/or ending the user interaction flow.

In some variations, a set of rendered panes are communicated to the client UI engine 130. The client UI engine 130 can cache or otherwise store the set of rendered panes. These pre-loaded rendered panes can be accessed and used when user action triggers their use. When a rendered pane is not locally stored, the client UI engine 130 interfaces with the workflow service 110 to receive an updated rendered pane or set of rendered panes.

The client UI engine 130 may include logic to present a set of different types of panes. In one implementation, the rendered panes may specify a pane type selected from a set of potential pane types. Alternatively, the rendered pane may include any suitable information to enable the client UI engine 130 to convert and present in a UI of the client application.

As discussed, in one implementation, a rendered pane may be a programmatic prop (property) data object. In such a variation, the client UI engine 120 can use a function to translate the prop data object into a UI element. For example, a React Component may take in the received rendered pane as a React Component prop and update a user interface within a DOM (Document Object Model) of a browser-based user interface.

While the system and method are described herein primarily for graphical user interface, the system and method could similarly be used with other modes of user interfaces such as an audio user interface.

3. Method

Figure 3:
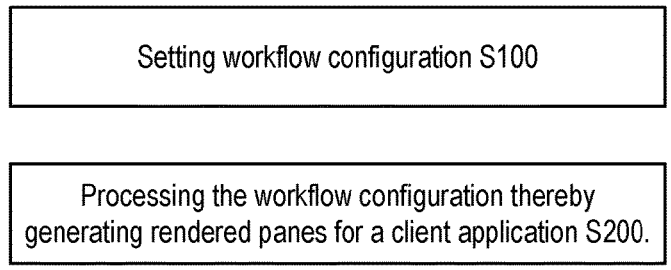
FIG. 3 is a flowchart representation of a method.

As shown in FIG. 3, a method for managing user interaction flows within third party client applications can include setting workflow configuration S100 and processing the workflow configuration thereby generating rendered panes for a client application S200. This method enables management of a client-implemented user interface based on cloud managed evaluation of a user interaction flow, which is specified through a workflow configuration.

Figure 4:
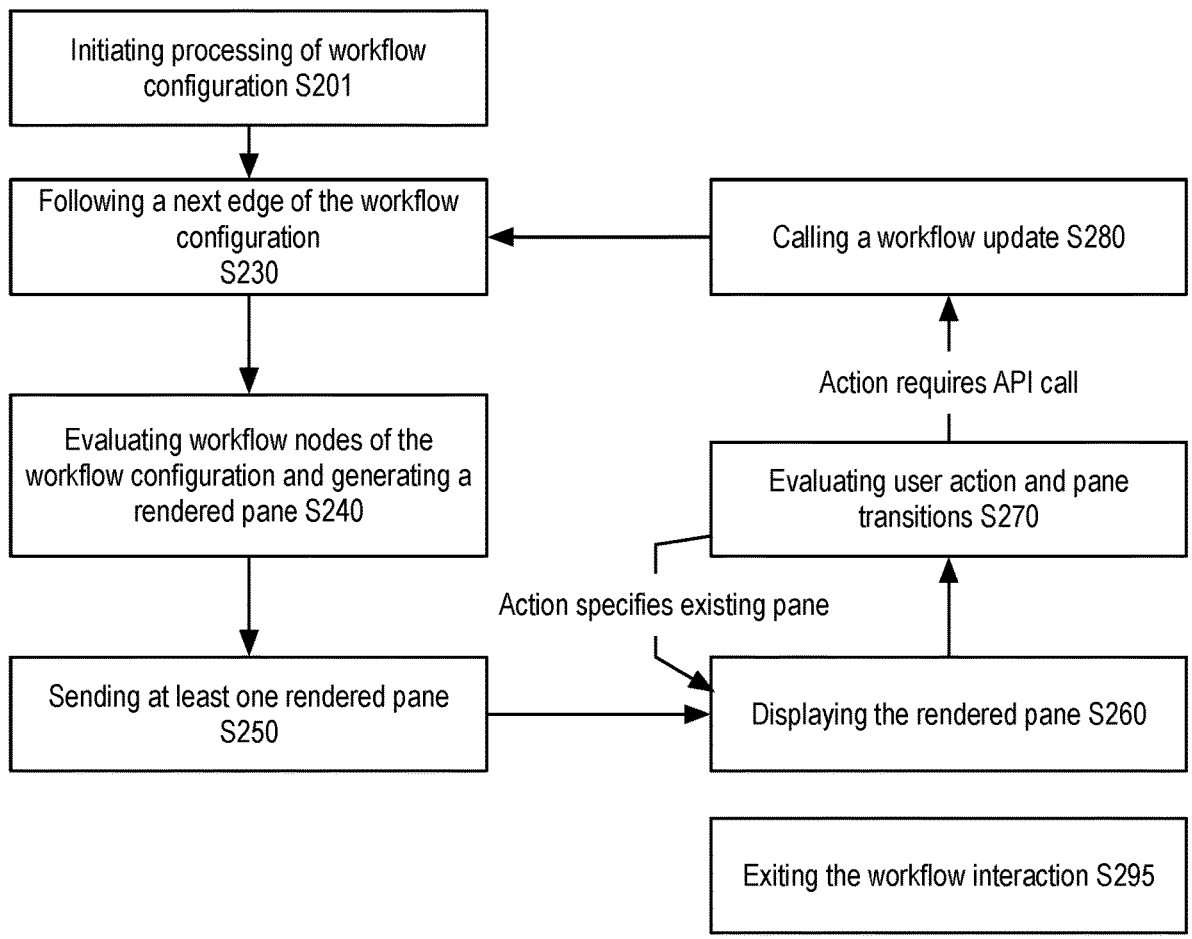
FIG. 4 is a detailed flowchart representation of processing workflow interaction.

As shown in FIG. 4, the processing of the workflow configuration in block S200 may be comprised of: initiating processing of workflow configuration S201; following a next edge of the workflow configuration S230; evaluating workflow nodes of the workflow configuration and generating a rendered pane S240; sending at least one rendered pane S250; displaying the rendered pane S260; evaluating user action and pane transitions S270; calling a workflow update S280; and exiting the workflow interaction in response to the server S295.

A variation of the method implemented at a workflow service (e.g., one or more server or processor-based devices in a cloud computing environment) for remotely managing user interaction flow at an external client application can include, processing of a workflow configuration by initiating processing of workflow configuration S201; following a next edge of the workflow configuration S230; evaluating workflow nodes of the workflow configuration and generating a rendered pane S240; and sending at least one rendered pane S250. This process may repeat to facilitate progressing through the user interaction flow broken up into different panes, until coming to an exit state for the workflow configuration and sending an exit command to the client application (S295).

In one particular variation, the method can include: initiating, in response to an initiation request of a client application, processing of a workflow configuration with an initial session state, wherein the workflow is a data model of a graph of nodes connected with directed edges, where nodes include a set of node types that includes at least a pane node; iteratively processing the workflow configuration, initially using the initial session state, thereby generating rendered panes for use in a user interaction flow of a client application, which comprises: following a next edge of the workflow configuration to determine a next workflow node, processing the next workflow node, which comprises, when the next workflow node is a pane node, rendering the pane node into a rendered pane, and sending the rendered pane to the client device.

In some variations, the type of nodes of the workflow configuration further includes a second type of node that is a processor node and a third type of node that is a switch node; and wherein processing workflow nodes comprises: when the node is a processor node, invoking a data processing method defined by the processor node to output a transformed data output; when the node is a switch node, evaluating the one or more value from the data payload input to the switch node and selecting a corresponding branch to another node.

More generally, processing of the workflow configuration S200 can include navigating the directed graph of a workflow configuration until arriving at state configured for transmission of a set of rendered panes to the client, and while navigating the directed graph, rendering a pane node, and outputting a rendered pane (S242). The initial state when initiating navigating the directed graph of the workflow configuration is set based on a request from a request from the client application. Here rendering a pane node can includes translating session state data (data payload supplied as an input to the pane node) into a rendered pane.

In one variation, processing of a pane node may trigger the state configured for transmission (i.e., a transmission condition). In other words, a rendered pane is sent to the client and processing halts until further communication is received from the client application. In other variations discussed herein, processing all of a set of neighboring pane nodes or other suitable groups of pane nodes may trigger the state configured for sending the set of rendered panes to the client application.

With the other node types like a processor node this may additionally include: while navigating the directed graph of the processing workflow configuration, invoking a processor node (S241). Invoking the processor node, can perform some action on the inbound data payload (e.g., the session state data) and generate an outbound data payload, which be a stored update to the session state data. A processor node may have only a single outbound edge and therefore the next connected node can be processed. The updated session state data can be used in processing the node connected by the single outbound edge of the processor node.

With the other node types like a switch node, this may additionally include: while navigating the directed graph of the processing workflow configuration, evaluating a switch node S243. Evaluating a switch node involves selecting, based on inbound data payload (e.g., current session state) an edge to determine a next node.

A variation of the method can include cooperative interaction between a workflow service and a client application. Accordingly, the method may include: a) at one or more servers of a workflow service, initiating, in response to an initiation request of a client application, processing of a workflow configuration with an initial session state, wherein the workflow is a data model of a graph of nodes connected with directed edges, where the nodes include a set of node types that includes at least a pane node; iteratively processing the workflow configuration, initially using the initial session state, thereby generating rendered panes for use in a user interaction flow of a client application, which comprises: following a next edge of the workflow configuration to determine a next workflow node, processing the next workflow node, which comprises, when the next workflow node is a pane node, and rendering the pane node into a rendered pane sending rendered panes to the client device; and b) at a client application, displaying the rendered panes; evaluating user action and pane transitions; and when a workflow update is required based on the user action and pane transition, calling a workflow update with user input collected. The client application may additionally call or initiate a workflow start.

A variation of the method may be implemented at a client application/device for controlling user interaction flow at the client device based on API communication with a remote service and can include, in association with remote processing of a workflow configuration: receiving at least one rendered pane (S250); displaying (or otherwise presenting) the rendered pane S260; evaluating user action and pane transitions S270; calling a workflow update S280. This process can repeat until initiating exiting the workflow interaction in response to the server S295. This variation of the method may be performed by the client using an API. Accordingly, this variation can include, at the client application: initiating processing of the workflow configuration with an API call to an API URI endpoint of a service; and transmitting a workflow update API request to a workflow update API URI endpoint of the service. Initiating an API call to the API URI endpoint involves transmitting a workflow initiate API request to a workflow initiate API URI endpoint of the workflow service which thereby initiates processing of the workflow configuration. A corresponding workflow service can facilitate processing of an appropriate workflow configuration and then sending one or a set of rendered panes in response to an API calls or other suitable responses such as an acknowledgement or exit command.

The method may additionally include, at the client application, updating session state analytics by transmitting a workflow state update API request. This can be used when the client application updates to a locally stored rendered panes from a current rendered pane, such that session state at the workflow service can be kept in synchronization.

Block S100, which includes setting a workflow configuration, functions to setup and define workflow configuration. The workflow configuration will be used in determining how a workflow service updates a user interaction flow on a client application. Setting workflow configuration preferably involves defining and storing data that defines the properties of a workflow configuration as described above. Accordingly, setting workflow configuration may include setting nodes and the connections of the nodes. In one preferred implementation, this may include setting a directed graph of nodes. In one preferred variation, the nodes include a set of node types that includes at least pane node(s). In another preferred variation, the set of node types that includes pane node(s), processing node(s), and switch node(s). Other suitable types of nodes may additionally or alternatively be used.

Setting workflow configuration may be set by receiving one or more data files defining the workflow configuration.

Alternatively, setting workflow configuration may include providing a workflow editor user interface wherein data of the workflow configuration data and its sub-components may be created and/or edited by the workflow editor user interface. In such a variation, setting a workflow configuration may include building a workflow configuration within a workflow editor application. Building the workflow configuration within the workflow editor application may include adding nodes (e.g., pre-configured nodes), adding node templates (e.g., nodes intended for editing), customizing, or editing nodes, setting connections between nodes, deleting nodes, and the like. In this way building the workflow configuration can set definition of a directed graph of pane nodes, processor nodes and switch nodes.

In one variation, user permissions may be set and enforced in viewing, editing, and/or performing other actions related to a workflow or portion of a workflow. For example, an account for an administrator from a marketing department may be granted editing permission over the copy presented within the user interfaces while a developer may be granted more permissions to alter logic and user interface flow.

In another variation, setting the workflow configuration may include referencing other workflows, nodes, or other sub-components. This may enable workflow configurations to depend on other workflow configurations in defining at least a portion of their operation.

In some variations, a library of workflow templates, nodes, sub-workflow portions may be navigable and selectable within a workflow editor user interface. The components of this library may be added to new workflows. They may be copied or symbolically linked so that they depend on a parent version of the component.

The workflow configurations may be customized to suit a number of different use-cases and types of user interaction flows. As one example, the workflow configuration can define a user interaction flow for multistep authentication, wherein the rendered panes include panes for collecting user input in response to earlier user input. While the method may be applied to a wide variety of applications, sign-on or authentication flows for a API service facilitating such activities may need to be able to handle a wide diversity of different flows depending on, for example, what account is being authenticated, to which external service authentication is occurring, the app in which the authentication process is happening, the type of action being performed, the type of authentication required, and/or other factors. For example, such method for dynamic interaction flows could be of use by systems and methods such as those described in U.S. patent application Ser. No. 14/790,840, filed Jul. 2, 2015, U.S. Pat. No. 9,449,346, and titled "SYSTEM AND METHOD FOR PROGRAMMATICALLY ACCESSING FINANCIAL DATA", which is fully incorporated by this reference.

In one particular variation of the method, a set of different workflow configuration versions may be defined. These different versions may be used in multivariate testing, A/B testing, gradual version roll out, or other applications. The set of different workflow configuration versions may be a set of distinct workflow configurations. This may alternatively be a workflow with select properties or nodes configured to have different settings.

Block S200, which includes processing the workflow configuration thereby generating rendered panes for a client application, functions to facilitate a workflow interaction within a client application. Processing the workflow configuration involves interaction between the workflow service (e.g., the service provider) and a specific client application. In general, the workflow service will facilitate multiple different workflow interactions for a plurality of different client applications. The plurality of client applications could involve different applications and different end users. Additionally, the client applications may make use of the same workflow configuration, but in many applications, a set of different workflow configurations will be used across the client applications.

Processing of a workflow configuration is generally initiated by a client application. The workflow service will primarily facilitate traversing and evaluating the nodes in a directed graph of the workflow configuration and sending resulting UI data (i.e., rendered pane(s)) to the SDK (a client user UI engine on a client application). The SDK can use the UI data to generate one or more UI for one or more panes/stages of a user interaction flow. The SDK can additionally subsequently return data representing user actions, and, in response, the workflow service continues to traverse the graph based on the data in those user actions, and the loop continues until the graph is exited or the user interaction flow otherwise ended.

Throughout this process, processing the workflow configuration can include storing or otherwise maintaining state data used by the workflow configuration. In one variation, this includes maintaining data as part of Session State. The session state may include global data as well as output from all the nodes.

In one variation, processing the workflow configuration can include, after initiating processing of a workflow configuration, creating a session object, which can function to store client configuration data (e.g., products, public key, etc.). The session object can also store the output of all nodes and stores it as what we call "Session State". This session state can be used to satisfy the input state requirements of nodes when walking the graph. In an alternative implementation, navigation of the graph can be stateless where navigation of the graph can depend only on the data passed to it and the immediate requests from a client application. Other approaches to storing and communicating data or information may alternatively be used.

In one exemplary variation, the kinds of data stored in the session state can include Global data, per-request data, and node output data.

Global data can be pre-populated at the start of every session (when a receiving an initiation request from a client application). It could include data like locale, device, SDK metadata, etc.

Per-request data can be populated at the start of every request. Examples could include request id, geoIP, user agent, data from user action or UI state at the client application.

Node Output can be populated with the output of pane and processor nodes. Node outputs could include data such as credentials, institution data, multi-factor authentication results, item, occurrence, and the like.

In one implementation, pane and processor nodes can declaratively define what session state they require as input and the workflow service can automatically inject the needed session state into their processing method automatically. A switch node can additionally check session state to determine an output edge. Additionally, static validation of the workflow graph can determine if the declared state is even available as input at that point in the graph.

Each workflow (i.e., graph of a workflow configuration) has an initial starting edge. Walking the graph from this starting edge follows the directed edges to a node and then a corresponding output edge of that node is used to determine the next step. When encountering a node where the set of node types include a processor node, a switch node, and a pane node, it will perform one of the following.

If it is a processor node, the backend will invoke a dynamic method specified by that processor node and then follow the outbound edge (a processor node generally has a single outbound edge).

If it is a switch node, the backend will evaluate the state data specified by the switch node configuration. The cases of the switch are value/edge pairs, so the switch will follow the edge of the matching case statement.

If it is a pane node, the backend will create a rendered pane using the pane node input and send the rendered pane down to the client. Walking will pause until the required output of the pane has been submitted by the client. In this way, navigation of the workflow will generally be performed in stages, with breaks occurring when a set of rendered panes can be sent to a client application. In some variations, batching of rendered panes may additionally be used, where panes can be preemptively rendered and sent as a collection.

In one preferred variation, the method repeatedly follows the edges of the workflow and processes workflow nodes and then sends a rendered pane after at least one rendered pane is generated. In one variation, sending a rendered pane to the client device occurs after processing a pane node. The navigation and/or processing of the directed graph of the workflow configuration can halt after sending the rendered pane.

In another variation, rendered panes may be sent in batches. They are preferably sent in batches for pane nodes that can be pre rendered without needing updated information from user actions. For example, pane nodes that neighbor one each other may qualify for rendering and sending in one communication to the client application. A condition of qualifying as a neighboring pane node may be if two pane nodes are directly connected by an edge. An alternative condition of qualifying as a neighboring pane node may be if a set of pane nodes are interconnected without a processing node, switch node, and/or other type of intermediary node. For example, a string of pane nodes may be processed, and a set of rendered panes generated.

In this way, processing the next workflow node may further include, when the next workflow node is a pane node with neighboring pane nodes, rendering the pane node and the neighboring pane nodes into a set of rendered panes. In such a variation, sending the rendered pane to the client device comprises, can further include sending the set of rendered panes. The set of rendered panes may be leveraged at the client application for reducing interactions with the workflow service, by transitioning to a stored rendered pane, if possible, as discussed herein.

As discussed, processing of the workflow configuration in block S200 can include: initiating processing of workflow configuration S201; following a next edge of the workflow configuration S230; evaluating workflow nodes of the workflow configuration and generating a rendered pane S240; sending at least one rendered pane S250; displaying the rendered pane S260; evaluating user action and pane transitions S270; calling a workflow update S280; and exiting the workflow interaction in response to the server S295.

Figure 5:
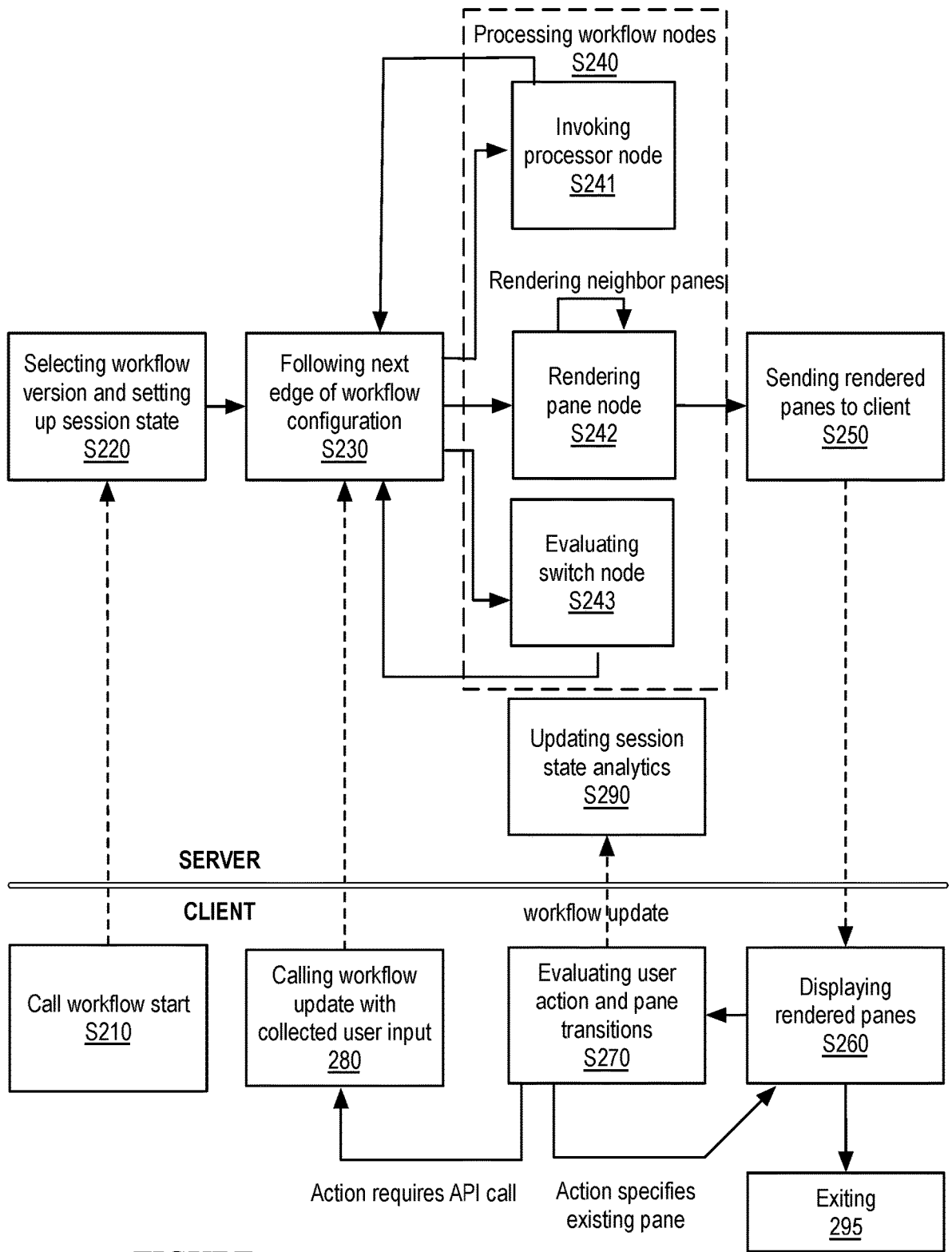
FIG. 5 is a detailed flowchart representation of interactions between a server and a client application when processing a workflow interaction.

As shown in FIG. 5, this may more specifically include: at a client application, calling workflow start S210; at server of the service provider: selecting workflow configuration and setting up session state S220, following a next edge of the workflow configuration S230, evaluating workflow nodes of the workflow configuration and generating a rendered pane S240, and sending at least one rendered pane S250; and then at the client application: displaying the rendered pane S260, evaluating user action and pane transitions S270, calling a workflow update S280, and exiting the workflow interaction in response to the server S295.

When considering the S200 as implemented at one or more servers (or other computer-based systems) of the workflow service, processing of the workflow configuration includes: receiving workflow initiation request from a client application instance (S110); selecting workflow configuration and setting up session state S220; following a next edge of the workflow configuration S230; evaluating workflow nodes of the workflow configuration and generating a rendered pane S240; and sending at least one rendered pane S250. Subsequently, the method can include, at one or more servers of the workflow service, receiving a workflow update request from a client application (S280), and repeating S230, S240, S250 with updated session state. Then after reaching an exit state in the workflow, exiting the workflow interaction, and sending an exit command to the client application (S295).

Block S201, which includes initiating processing of workflow configuration, functions to start a new workflow interaction for a client application. Initiating processing of the workflow configuration is preferably performed in response to an action taken by the client application. Accordingly, initiating processing of workflow configuration can include: at the client application calling workflow start S210 and at the server selecting workflow configuration and setting up session state S220.

Block S210, which includes calling workflow start, functions to instruct a server to begin directing a workflow interaction. Block S210 can include, at the client application, determining to initiate workflow interaction and transmitting a workflow initiation request to a workflow processing engine. Calling workflow start may be managed by an SDK. In one implementation, calling workflow start transmits a message to an exposed workflow service API of the workflow service (e.g., a start API endpoint). A client application will generally determine to initiate the workflow interaction when the state of the client application is updated to one that makes use of a view dependent on the workflow interaction. For example, if a user triggers a user authentication action within the client application it may initiate a user interaction flow that facilitates authentication guided by the workflow service.

In response to calling workflow start, the workflow service will correspondingly receive a workflow initiation request at a server of the workflow service.

The request for workflow start will preferably include the necessary information to determine which workflow configuration to start. The request may also be authenticated using credentials of a user account. In some variations, the identity of the requester (e.g., the developer user account) and/or other metadata (client user identifier) may also be used to selectively determine the workflow version. While this may be used for various applications, one exemplary use case would be to select different workflow versions depending on the client application and the user of that client application.

Block S220, which includes selecting workflow configuration and setting up session state, functions to setup workflow configuration for use with the client application. Selecting workflow configuration may include selecting a workflow version. Setting up session state functions to initialize the session state information used in managing the workflow execution. In some instance variations, session state may be initialized to a default state. In other instance variations, the session state may be initialized using available information from the workflow initiation request. In other instance variations, the session state may be initialized by loading session state using available information such as parameters from the workflow initiation request.

In some implementations, workflow configuration selection could be used to provide customized user interaction flows to different segments of users. For example, different workflow configurations could be created for different geographic regions.

As yet another variation, the method can include dynamically selecting a version of a workflow configuration according to settings of an account. This may be used when performing multivariate or A/B tests, when performing gradual rollout out of a new workflow version, and/or during other situations. An account could configure a set of different workflow configuration versions. In exemplary A/B testing use case, the workflow configurations can be fairly similar in nature but with slight differences.

Selecting a version of a workflow configuration may include selecting different node options (e.g., different pane node versions for a particular pane node in the workflow configuration).

Selecting a version of a workflow configuration may include selecting different workflow configuration files. In this way different interaction flows entirely can be selected. For example, an experiment may be run to test different ordering of panes to track conversion rates of the different workflow configurations.

When using dynamic selection of versions of a workflow configuration is used for testing purposes, the method may additionally include collecting analytics and saving analytics in association with the dynamically selected workflow configuration. This data may be used to determine versions of workflow configurations with performance characteristics (as indicated in the saved analytics) that may be selected for further usage. In one variation, the method can then dynamically select a version of the workflow configuration based on collected analytics and comparison of the different versions.

Blocks S230 and S240 are preferably performed repeatedly. Accordingly processing the workflow configuration can include traversing the directed graph of the workflow configuration by repeatedly: following a next edge of the workflow configuration, evaluating a workflow node to determine an output edge, and repeating until a suitable set of rendered panes are generated. As discussed, in some variations a single rendered pane can trigger halting traversal and sending the rendered pane to the client application. In other variations, a set of rendered panes may be generated prior to trigger halting traversal and sending the rendered pane to the client application. In this variation, generating rendered panes for all neighboring panes may be the condition for halting traversal and sending the rendered pane to the client application.

Block S230, which includes following a next edge of the workflow configuration, functions to transition the workflow interaction according to the directed graph of the workflow configuration. Following the next edge of the workflow configuration 230 evaluates the directed graph of the workflow configuration and determines a subsequent workflow node. Execution then transitions to processing of the appropriate workflow node.

In one preferred implementation, a processor node has one outbound edge and so following the next edge after a processor node leads to evaluating the next connected node. A switch node will have multiple possible outbound edges, and the result of the switch node is selection of one of those edges. Accordingly following the next edge for a switch node is following the outbound edge selected by the switch node. A pane node may have multiple possible outbound edges as well, where the outbound edges can correspond do different actions.

Block S240, which includes evaluating workflow nodes of the workflow configuration and generating a rendered pane, functions to perform the operations of the nodes and continue to navigation of the directed graph of the workflow configuration. Evaluating workflow nodes can include selectively performing one or more of: invoking a processor node S241, rendering a pane node S242, and/or evaluating a switch node S243. Evaluating processing nodes and switch nodes can be a conditionally cyclical process until rendering a pane node is reached in which case it proceeds to S250. In a variation with batched rendering of panes, evaluating processing nodes and switch nodes can be a conditionally cyclical process until rendering a first pane node is reached which then triggers rendering any neighboring pane nodes, and sending resulting rendered panes from the first pane node and the neighboring pane nodes during S250.

Block S241, which includes invoking a processor node, functions to perform logic. More specifically invoking the processor mode includes invoking a data processing method defined by the processor node to output a transformed data output. Processing a processor node, when processing the workflow configuration results in subsequently processing a node connected to the output edge of the processor node. The processor node preferably takes an input and generates some output, which is used in updating session state. Invoking a processor node may call on other internal or external services and/or perform any suitable operation. Invoking a processor node could additionally or alternatively fetch or retrieve data.

Block S242, which includes rendering a pane node, functions to render a pane. Rendering the pane node takes the inbound input and generates a rendered pane using the session state. The rendered pane is one that describes UI elements for that particular stage of the workflow interaction. The rendered pane is preferably in a format that can be transformed into a rendered user interface at the client application.

Given the current session information and the configuration of a pane node, the workflow service has sufficient information to determine what should be shown to the user on a given pane.

Rendering the pane node can include evaluating current session state and configuration of the pane node to output a rendered pane. In one variation, a rendered pane can contain a pane type (e.g., "Credentials Pane") and all information necessary to display that pane type to the user (e.g., color, text/strings, logo, translated text, etc.). In one implementation, the rendered pane could be characterized as a React component prop or other suitable data object.

Client applications are preferably served a sequence of rendered panes to display. The rendered panes can be explicitly typed, and, depending on implementation, can range from very specific (e.g., AccountTypeSelectPane) to generic templated panes (e.g., InputsPane).

One task of the client application can be to collect user input from displayed panes and send the user input to the workflow service to compute the next set of panes to display. This may be accomplished by having each specific rendered pane have a correlated "Output" proto which the client sends to the backend. The output proto has a specific proto sub-message for each action a user can take on a pane which contains the required collected user input (see early prototype). Upon receiving the output payload, the backend knows which action the user took and can follow the appropriate output edge of the pane node to continue walking the graph (more on this in the "backend" section below).

Rendering a pane node may additionally include rendering neighbor panes. When evaluating a pane node, the method may search the directed graph for neighboring pane nodes and prerender those pane nodes. This functions to batch the rendering of related panes and possibly reduce communication between the client and server.

Block S243, which includes evaluating a switch node, functions to evaluate the one or more value from the data payload input to the switch node (e.g., a value from the current session state) and selecting a corresponding branch to another node. In one preferred implementation, the input to the switch node can be one or more values stored in the session state, selection of a branch is used by block S230 to determine the next node.

Block S250, which includes sending at least one rendered pane, functions to transfer a generated rendered pane to the client application. The rendered pane is preferably transmitted to the client application that had made the workflow initiation request. Sending at least one rendered pane preferably includes sending the rendered pane from the current pane node. Sending at least one rendered pane may additionally include sending the rendered neighbor panes. In the case where the workflow interaction is over, sending a rendered pane may be replaced with sending an exit command, which initiates transition to exiting the workflow interaction S295. In one implementation, one type of "rendered pane" can be an exit pane which when processed by the client UI engine of the client application can result in exiting the interaction flow.

As a complimentary process to sending the rendered pane(s), the method can include, at a client application, receiving the at least one rendered pane. When a single rendered pane is received, it may be passed to S260 for displaying. When a set of rendered panes are received, the current rendered pane can be used for updating the current user interface, and the remaining rendered panes of the set of rendered panes can be stored or cached for possible local use.

As mentioned, in some variations the method may include operations performed at a client application. These processes may additionally be applied independent from operation of the workflow service as a method for a client to interact with a suitable remote workflow service. In such variations, the processing the workflow configuration thereby generating rendered panes for a client application S200 can include, at the client application, displaying the rendered panes S260; evaluating user action and pane transitions S270; and when a workflow update is required based on the user action and pane transition, calling a workflow update with user input collected S280.

Block S260, which includes displaying the rendered pane, functions to present the user interface of the rendered pane at the client application. The client application preferably receives the rendered pane and then updates the user interface to display or otherwise present the rendered pane. Displaying the rendered pane may involve performing any suitable action related to updating a user interface. The rendered pane preferably defines various input elements that can be used in monitoring specific user actions. For example, the rendered pane may define a login window with two text input fields, a submit button and a cancel button.

In one implementation, a rendered pane may be a programmatic prop (property) data object. In such a variation, Block S260 can include translating the prop data object into a UI element presented within the client application. For example, a React Component defined through script instructions (e.g., JavaScript) may take in the received rendered pane as a React Component prop and update a user interface within a DOM (Document Object Model) of a browser-based user interface.

Herein, the method is described primarily as being used with a graphical user interface. However, the method may also be used with an audio user interface or any suitable type of user interface. Accordingly, the rendered pane may define any properties of a segment of user interaction that can be presented in a user interface.

Block S270, which includes evaluating user action and pane transitions, functions to monitor for events that trigger a change in the UI. A change in the UI will generally result from some user interaction. However, the rendered pane may alternatively define an alternative input that is not received from an end user of the client application. Pane transitions may involve going back to previous panes or other suitable transitions.

Evaluating user action and pane transitions may include determining if an updated API call is needed to update the pane or if a cached or prerendered pane would be available. Accordingly, evaluating user action and pane transitions may include determining when to initiate an API call for a workflow update in order to update a current pane of the workflow. Requesting a workflow update via an API call can be used in situations where only one rendered pane is sent or stored at a time.

Alternatively, requesting a workflow update via an API call may additionally be used in situations where the client application dynamically selects to either use a locally stored rendered pane or request a new rendered pane. In the event user action specifies a workflow update to an existing pane such as one of the neighboring prerendered panes or a cached pane, the process can revert back to displaying the indicated existing pane and return to process S260. In the event the user action leads to a new API call or a transition to a pane not currently available, then the processing can transition to calling a workflow update API endpoint in S280.

Accordingly, evaluating user action and pane transitions may include determining when to initiate an API call for a workflow update in order to update a current pane of the workflow and determining when an existing rendered pane in a set of rendered panes (stored or locally accessible by the client application) can be used to update a current pane of the workflow. This variation may be used when batch preparation and sending of rendered panes is used. Accordingly rendering a pane node will generally include rendering a set of rendered panes including rendering a current pane node and neighboring pane nodes in the workflow and sending the rendered pane will further include sending the set of rendered panes. A client application may additionally or alternatively store or cache rendered panes and if they can be reused if available.

Block S280, which includes calling a workflow update, functions to request an update to the workflow interaction from the workflow service. Calling a workflow update preferably includes transmitting a workflow update request which then results in, at the workflow service, receiving a workflow update request and then transitioning to the next edge of the workflow configuration as determined by block S230. The workflow update request preferably includes user input data, which can be used for updating session state.

When the workflow concludes, the workflow interaction can exit. In one implementation, the workflow service renders a pane signaling an exit or the workflow service generates an exit command. This exit command in place of or in the form of a rendered pane results in exiting the workflow interaction at the client application S295. The conclusion of the workflow interaction at the workflow service can additionally be modeled. In some variations, the session state can be stored and possibly reinvoked.

In some variations, the method may additionally include updating session state analytics S290. Updating session state analytics S290 is preferably a process initiated as a result of evaluating user action and pane transitions S270. State analytics may alternatively be updated at any suitable point. In one implementation, updating session state analytics may be used as a parallel process when locally stored rendered panes are used. This may be used to keep session state in a workflow service in synchronization with the local user interaction flow despite the workflow service not needing to take any action at that time. Alternatively, such updates may be communicated if and when a workflow update API call is triggered.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., non-transitory computer-readable mediums) storing instructions that, when executed by the one or more computer processors, cause a computing platform to perform operations comprising those of the system or method described herein such as: setting workflow configuration and processing the workflow configuration thereby generating rendered panes for a client application, which may include: initiating processing of workflow configuration; following a next edge of the workflow configuration; evaluating workflow nodes of the workflow configuration and generating a rendered pane; sending at least one rendered pane; displaying the rendered pane; evaluating user action and pane transitions; calling a workflow update; and in response to the server exiting the workflow interaction.

Figure 7:
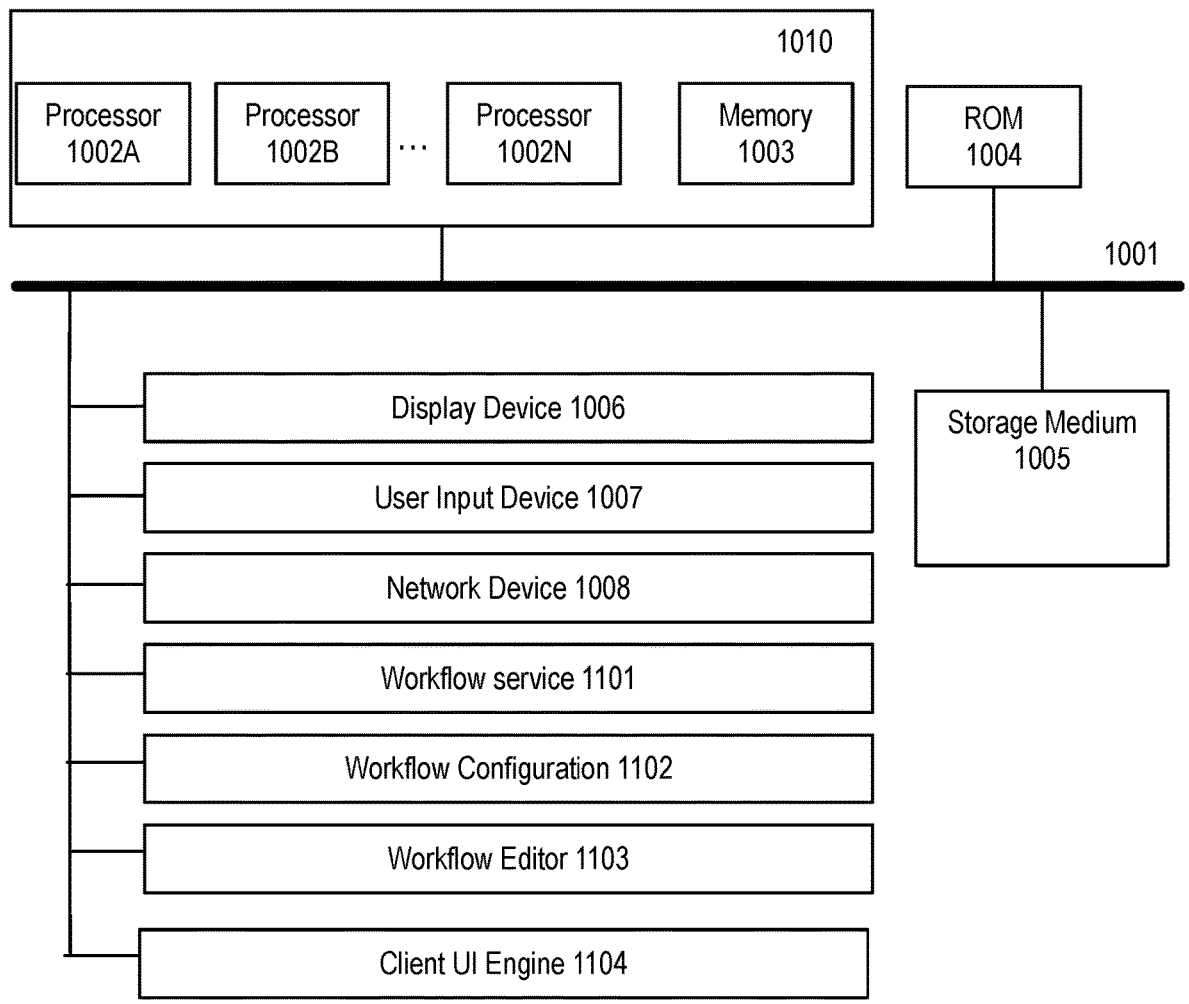
FIG. 7 is an exemplary system architecture that may be used in implementing the system and/or method.

FIG. 7 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting a workflow service 1101, workflow configuration 1102, workflow editor 1103, client UI engine 1104, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method, comprising:
    transmitting, by a device, an initiation request to a first application programming interface (API) universal resource identifier (URI) endpoint of a workflow service,
        wherein a workflow associated with the initiation request is a graph model of a workflow interaction that includes a pane node of a plurality of nodes that are connected;
    generating, by the device and based on processing a workflow configuration, a plurality of rendered panes, wherein the pane node is configured to take input data to generate a rendered pane, of the plurality of rendered panes, that specifies parameters for a user interface, and wherein processing the workflow configuration comprises:

following a next edge of the workflow configuration to determine a next workflow node, and rendering the next workflow node into the rendered pane when a type of the next workflow node is a pane node type, wherein rendering the next workflow node into the rendered pane when the type of the next workflow node is the pane node type comprises rendering a set of pane nodes, that includes the next workflow node and one or more neighboring pane nodes, into a set of rendered panes;

displaying, by the device, the plurality of rendered panes;

determining, by the device and based on evaluating pane transitions, that a workflow update is required, wherein evaluating pane transitions comprises determining whether an existing rendered pane of the set of rendered panes can be used to update a current pane of the workflow; and transmitting, by the device, an update request to a second API URI endpoint of the workflow service.

2. The method of claim 1, wherein rendering the next workflow node into the rendered pane when the type of the next workflow node is the pane node type comprises:

rendering an inbound input of the next workflow node; and generating the rendered pane based on a session state.

3. The method of claim 1, wherein a version of the workflow configuration is selected from a set of different versions of the workflow configuration.

4. The method of claim 1, wherein the plurality of nodes are connected by one or more directed edges that define possible paths for navigating the graph model during the workflow interaction.

5. The method of claim 1, wherein the graph model includes a starting edge associated with the workflow.

6. The method of claim 1, further comprising:

transmitting at least one of an acknowledgement or an exit command.

7. The method of claim 1, wherein a type of node of the plurality of nodes includes at least one of:

the pane node type,
a processor node type, or
a switch node type.

8. A device, comprising:

one or more memories; and
one or more processors, coupled to the one or more memories, configured to:

transmit an initiation request to a first application programming interface (API) universal resource identifier (URI) endpoint of a workflow service, wherein a workflow associated with the initiation request is a model of a workflow interaction that includes a pane node of a plurality of nodes that are connected;

generate, based on processing a workflow configuration, a plurality of rendered panes, wherein the pane node is configured to take input data to generate a rendered pane, of the plurality of rendered panes, that specifies parameters for a user interface, and wherein the one or more processors, to process the workflow configuration, are configured to:

follow a next edge of the workflow configuration to determine a next workflow node, and render the next workflow node into the rendered pane when a type of the next workflow node is a pane node type, wherein rendering the next workflow node into the rendered pane when the type of the next workflow node is the pane node type, are configured to render a set of pane nodes, that includes the next workflow node and one or more neighboring pane nodes, into a set of rendered panes;

display the plurality of rendered panes;

determine, based on evaluating pane transitions, that a workflow update is required, wherein evaluating the pane transitions comprises determining whether an existing rendered pane of the set of rendered panes can be used to update a current pane of the workflow; and transmit an update request to a second API URI endpoint of the workflow service.

9. The device of claim 8, wherein the one or more processors, to render the next workflow node into the rendered pane when the type of the next workflow node is the pane node type, are configured to:

render an inbound input of the next workflow node; and
generate the rendered pane based on a session state.

10. The device of claim 8, wherein a version of the workflow configuration is selected from a set of different versions of the workflow configuration.

11. The device of claim 8, wherein the plurality of nodes are connected by one or more directed edges that define possible paths for navigating the model during the workflow interaction.

12. The device of claim 8, wherein the model includes a starting edge associated with the workflow.

13. The device of claim 8, wherein a type of node of the plurality of nodes includes at least one of:

the pane node type,
a processor node type, or
a switch node type.

14. The device of claim 8, wherein the one or more processors are configured to:

transmit at least one of an acknowledgement or an exit command.

15. A non-transitory computer-readable medium storing a set of instructions, the set of instructions comprising:

one or more instructions that, when executed by one or more processors of a device, cause the device to:

transmit an initiation request to a first application programming interface (API) universal resource identifier (URI) endpoint of a workflow service, wherein a workflow associated with the initiation request is a model of a workflow interaction that includes a pane node of a plurality of nodes that are connected;

generate, based on processing a workflow configuration, a plurality of rendered panes, wherein the pane node is configured to take input data to generate a rendered pane, of the plurality of rendered panes, that specifies parameters for a user interface, and wherein the one or more instructions, that cause the device to process the workflow configuration, cause the device to:

follow a next edge of the workflow configuration to determine a next workflow node, and render the next workflow node into the rendered pane when a type of the next workflow node is a pane node type, wherein rendering the next workflow node into the rendered pane when the type of the next workflow node is the pane node type comprises rendering a set of pane nodes, that includes the next workflow node and one or more neighboring pane nodes, into a set of rendered panes;

display the rendered panes;

determine, based on evaluating pane transitions, that a workflow update is required, wherein evaluating pane transitions comprises determining whether an existing rendered pane of the set of rendered panes can be used to update a current pane of the workflow; and transmit an update request to a second API URI endpoint of the workflow service.

16. The non-transitory computer-readable medium of claim 15, wherein the one or more instructions, that cause the device to render the next workflow node into the rendered pane when the type of the next workflow node is the pane node type, cause the device to:

render an inbound input of the next workflow node; and generate the rendered pane based on a session state.

17. The non-transitory computer-readable medium of claim 15, wherein a version of the workflow configuration is selected from a set of different versions of the workflow configuration.

18. The non-transitory computer-readable medium of claim 15, wherein the plurality of nodes are connected by one or more directed edges that define possible paths for navigating the model during the workflow interaction.

19. The non-transitory computer-readable medium of claim 15, wherein the model includes a starting edge associated with the workflow.

20. The non-transitory computer-readable medium of claim 15, wherein the one or more instructions cause the device to:

transmit at least one of an acknowledgement or an exit command.

* * * * *